United States Patent
Storm

(10) Patent No.: US 7,239,620 B2
(45) Date of Patent: Jul. 3, 2007

(54) SYSTEM AND METHOD FOR FACILITATING NETWORK-TO-NETWORK TRANSITIONS

(75) Inventor: Brian D. Storm, Round Lake Beach, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/831,847

(22) Filed: Apr. 26, 2004

(65) Prior Publication Data

US 2005/0237963 A1 Oct. 27, 2005

(51) Int. Cl.
*H04Q 7/00* (2006.01)

(52) U.S. Cl. .................. 370/331; 370/310.2; 370/313; 370/315; 370/319; 370/321; 370/328; 370/338; 455/436; 455/439

(58) Field of Classification Search ................ 370/310, 370/319–321, 328, 329, 331, 335–337, 342, 370/347; 455/436–442
See application file for complete search history.

(56) References Cited

U.S. PATENT DOCUMENTS

| 2005/0048972 A1* | 3/2005 | Dorenbosch et al. ....... 455/436 |
| 2005/0059400 A1* | 3/2005 | Jagadeesan et al. ........ 455/436 |

* cited by examiner

*Primary Examiner*—Raj K. Jain

(57) ABSTRACT

A system and method for facilitating network-to-network transitions of mobile stations comprising includes at least one access point (204). At least one receiver (202, 224 or 230) is coupled to the at least one access point. The at least one receiver (202, 224 or 230) determines information concerning a wide area network and provides the information to the access point (204). The access point (204) conveys the information to at least one mobile station (206).

17 Claims, 3 Drawing Sheets

US 7,239,620 B2

SYSTEM AND METHOD FOR FACILITATING NETWORK-TO-NETWORK TRANSITIONS

FIELD OF THE INVENTION

The invention relates generally to communication systems and more particularly to communication devices that transition between networks.

BACKGROUND OF THE INVENTION

Systems and networks for transmitting information are well known and are often classified according to the size of the coverage area of the respective system or network. As one example, a wide area network (WAN) may provide coverage over a wide area, for example over an entire a city, state, or region of a country. Conventional cellular communication systems are one example of a WAN. Other networks may extend coverage only to smaller, localized regions and are referred to as local area networks (LANs). For example, a wireless local area network (WLAN) may provide wireless coverage to users within a particular building, or over a college or business campus.

Mobile stations, for example cellular telephones, often need to operate in both types of networks and, therefore, must also have the ability to transition between different types of networks. For example, a mobile station may operate in a WLAN while within a specific room because it is more economical to use a WLAN in that particular setting. However, as the mobile station reaches the limit of the coverage area of the WLAN (e.g., at the edge of the room), the mobile station needs to transition to the WAN in order to maintain unbroken communications.

Mobile stations often have a preferred network, service provider, and/or radio access technology (RAT). The preferred choice often depends upon the cost of the service or other service benefits. In one example, the mobile station may connect to the WLAN when inside an enclosed area, such as a room or office, but then transition to a WAN as the mobile station leaves the enclosed area.

Conventional multimode mobile stations are almost always battery powered and can consume a great deal of energy searching for WAN service while still operating in a WLAN. The station must account for the possibility that it may be on the edge of WLAN coverage and should therefore be ready for a WLAN to WAN handoff at any time. Since initial acquisition is often a time consuming processing, taking many seconds per failed attempt and often multiple seconds for successful attempts, the station must continuously look for WAN service at a minimum across several different channels and possibly multiple RATs as well. In conventional systems, if the acquired RAT or service provider is not the first choice, the station often continues to scan, in hopes of finding a higher, more preferred choice. If the WLAN is the preferred system of the mobile station, even after WAN service has been found, the mobile station must do periodic scans to keep information updated until WLAN coverage degrades to the point where a handoff from the WLAN to the WAN occurs. Such constant scanning by the mobile station wastes the energy of the battery of the station and also consumes valuable processing time that could be used for other purposes.

Figure 1:
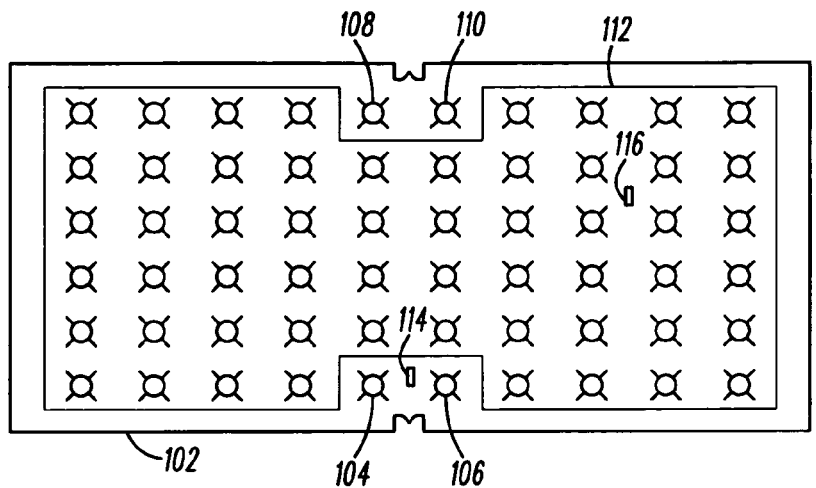
FIG. 1 is a block diagram showing mobile devices within a WLAN/WAN according to principles of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENTS

Pursuant to many of these embodiments, a system and method for facilitating network-to-network transitions of mobile stations allows mobile stations to transition seamlessly from a first network to a second network. To this end, the mobile stations receive information from an access point to allow the mobile station to quickly and easily transition from a first network to a second network. By using this approach, the mobile station itself does not have to constantly monitor for the information needed to complete a hand-off to the second network and a user does not notice that a transition has taken place.

Pursuant to a preferred embodiment, a WLAN access point is coupled to at least one WAN receiver. The receiver determines information concerning a wide area network and provides the information to the access point. The access point then conveys the information to the mobile station.

The mobile station determines a preferred service provider from the information received from the access point. The wide area network may be a code division multiple access (CDMA) network, a global system for mobile communications (GSM) network, an advanced mobile phone service (AMPS) network, a wideband code division multiple access (WCDMA) network, or a time division multiple access (TDMA) network.

Pursuant to another preferred approach, multiple receivers are coupled to the access point. Each of the receivers may receive messages according to a particular type of RAT. For example, one receiver may be structured to receive CDMA messages, another receiver may receive GSM messages, a different receiver may receive AMPS messages, still another receiver may receive WCDMA messages, and yet another receiver may receive TDMA messages. The messages received by the receivers are all forwarded to the access point where they are processed into a format that can be used by mobile stations. The access point then conveys the information to a mobile station.

In many of these embodiments, different types of information may be provided by the access point to the mobile station. For example, the information may include the RATs available, the channels on which service can be found and the network information associated with each RAT. For CDMA networks, pilot strength measurement reports for all or some of the neighbor list can be sent to the mobile station. In the case of GSM, the access point could convey the WLAN time at which the next Fast Associated Control Channel (FACCH) burst will occur on the GSM network, allowing the station to optimally time its scans on the WAN. Optionally, the WAN receivers coupled to the access point may assist the mobile to more rapidly acquire WAN network timing by enabling WAN/WLAN relative timing to be conveyed to the mobile by the access point.

Additionally, contents of messages transmitted for general use by all mobiles can be passed on to the mobile to ease and speed the transition to the WAN. For example, a mobile cannot access the WAN until specific system parameters have been received. This could happen while the mobile still is on the WLAN, significantly shortening the transition time from WLAN to WAN.

Thus, the access point and specifically the receivers at the access point perform functions previously performed exclusively by mobile stations shifting the burden from the battery-powered mobile to AC-powered access point. The mobile stations of the present system do not have to constantly monitor for a second network in anticipation of transitioning to that network. Instead, the stations only have to determine when they are near a transition point from a first network to a second network. In the present approach, the mobile station saves power because it does not have to constantly monitor for a second network. The information provided by the access point to the mobile station allows the mobile station to transition to its preferred RAT/service, provider in a minimum time and using a minimum amount of energy.

Referring initially to FIG. 1, a system for facilitating transitions between networks includes a plurality of access points 104, 106, 108, and 110 as well as a grouping 112 of multiple access points, all disposed in a room 102. Two mobile stations 114 and 116 are also present in the room 102.

The access points 104, 106, 108, 110 and within grouping 112 transmit and receive data. The access points 104, 106, 108, 110 and within grouping 112 also connect users to other users within the network and also can serve as the point of interconnection between the WLAN and a fixed wire network. Each access point can serve multiple users within a defined network area. As mobile stations move beyond the range of one access point, they are automatically handed over to the next access point. Although in the example of FIG. 1 multiple access points are shown, a small WLAN may only require a single access point. The number of access points required to provide coverage typically increases as a function of the number of network users and the physical size of the network.

The access points 104, 106, 108 and 110 include receivers. The access points 104, 106, 108 and 110 having receivers are located on the border area between network coverage areas and where hand-offs between the coverage areas would occur. The receivers on these access points monitor for information involving specified RATs and/or service providers. In contrast, the access points within the grouping 112 do not include receivers.

The information transmittal to the station 114 could include the RAT available, the channels on which the service can be found, and the operator/network information associated with each one allowing the station to go directly to its most preferred RAT/service provider combination. In the case of a CDMA network, strength measurement reports for some or all of the neighbor list may be sent, further reducing the need for the station to spend time accessing these measurements while using a boundary access point. For GSM networks, the access point could convey the WLAN time at which the next FACCH burst will occur on the GSM network, allowing the station to time its scans on the WAN system.

The mobile stations 114 and 116 may be any type of mobile wireless device. For example, the wireless device may be a cellular telephone, personal digital assistant, or pager. The mobile devices 114 and 116 operate in different operating modes and across different types of networks.

In operation, the mobile stations 114 and 116 are free to move inside and outside of the room 102. For example, if the mobile stations are cellular telephones a user may move in the room. However, the user may move outside the room 102.

In one approach, the mobile station 116 remains in the room and does not approach any of the limits of the coverage area of the WLAN. Consequently, the station 116 stays on the WLAN and does not need to obtain network-to-network transition information.

In other circumstances, the mobile station may near the coverage limits of the WLAN and, therefore, a network-to-network transition becomes required. For instance, as shown in FIG. 1, as the mobile station 114 nears the door it detects an indicator bit transmitted by the access points 104 or 106 which indicates that there is information available for the mobile station 114 to allow it to transition to another network. The mobile station can then query the access points 104 or 106 to obtain the information and make the transition. In this case, a query is sent and the access point 104 or 106 returns the requested information to the mobile station 114. Alternately, the mobile station could query for this information following each handoff automatically in the event that the access point does not broadcast the indicator bit.

Figure 2:
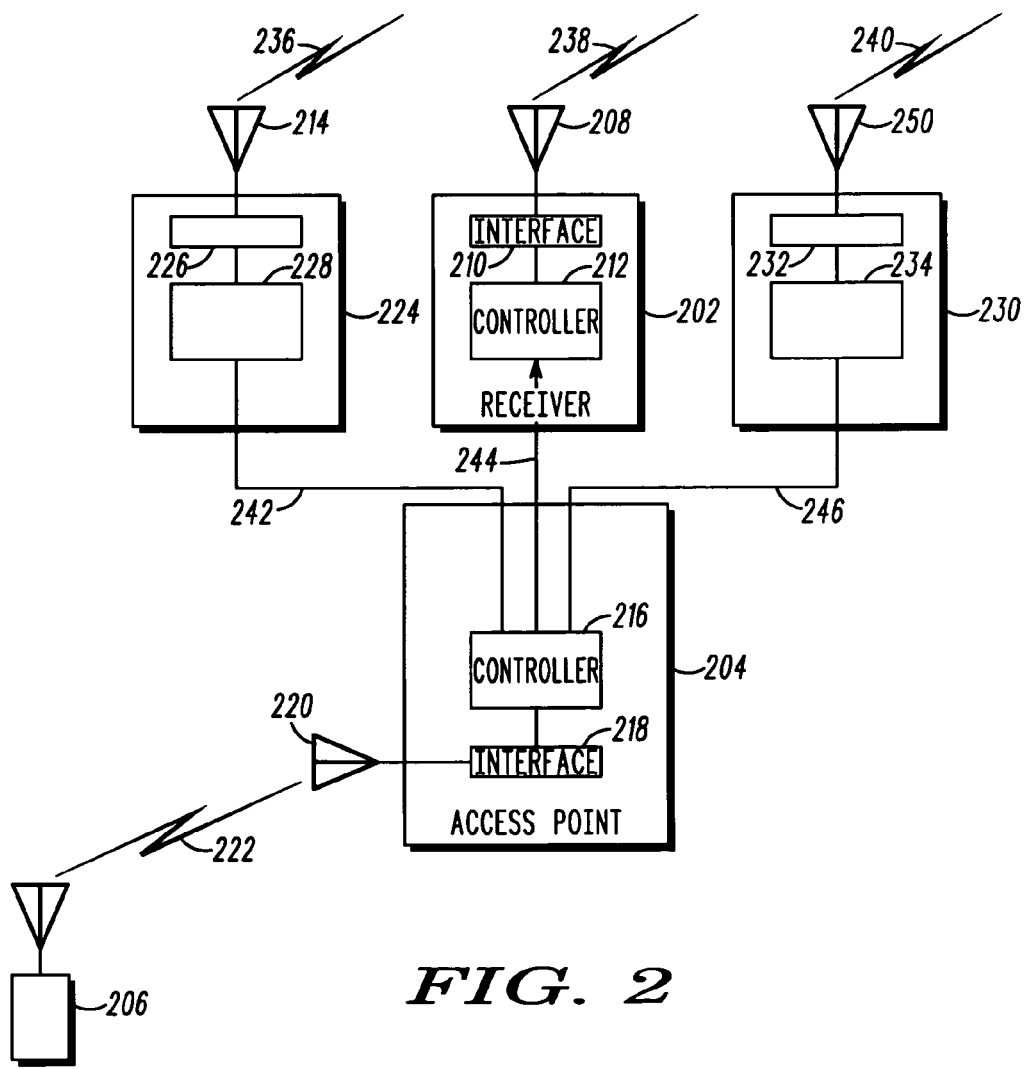
FIG. 2 is a block diagram of an access point according to principles of the present invention.

Referring now to FIG. 2, an access point coupled to a group of receivers is described. An access point 204 is coupled to three receivers 202, 224 and 230. Each of the receivers 202, 224 and 230 receives different types of communications. For instance, the receiver 202 may receive signals from GSM cellular system, the receiver 224 may receive signals from an AMPS system, and the receiver 230 may receive signals from the TDMA system. Although three receivers are shown in FIG. 2, it will be understood that any number of receivers may be used with each of the receivers scanning and processing from a different RAT.

Further, the receivers 202, 224 and 230 are coupled to the access point 204 by cables 242, 246 and 248. The cables 242, 246 and 248 are conventional cables of any type used in telecommunication applications.

The receivers 224, 202 and 230 include antennas 214, 208 and 250. The antenna 214 receives a GSM signal 236, the antenna 202 receives an AMPS signal 238 and the antenna 250 receives a TDMA signal 240.

The receivers 224, 202 and 230 also include interfaces 226, 210 and 230. The function of the interfaces is to convert the received signals 236, 238 and 240 from RF signals to signals usable by a digital controller.

In that regard, the interfaces 226, 210 and 232 are coupled to controllers 228, 212 and 234. The controllers 228, 212 and 234 are responsible for scanning for appropriate signals 236, 238 and 240 (from different networks) and obtaining the information from the appropriate interface 226, 210 or 232 and extracting relevant information from the received messages.

The information extracted from the messages is then received at the access point 204 by a controller 216. The controller 216 converts the information into an appropriately formatted message to be sent to an interface 218 via an antenna 220. The interface 218 converts the information from a digital form to an analog/RF form to be sent as a signal 220 to a mobile station 206.

The information sent to the mobile station 206 can include a number of different components in any type of format. For instance, the information may include the RAT(s) available, channels on which communication is available or signal strength measure reports (in the case of CDMA or WCDMA). Other types of information may also be sent to the mobile station 206.

Once received, the mobile station 206 processes the message. In this regard, the mobile station 206 decides the RAT/service provider combination to use. For example, the mobile station may determine whether its preferred choice is available, and if not, determine an alternative network to which it can transition.

Figure 3:
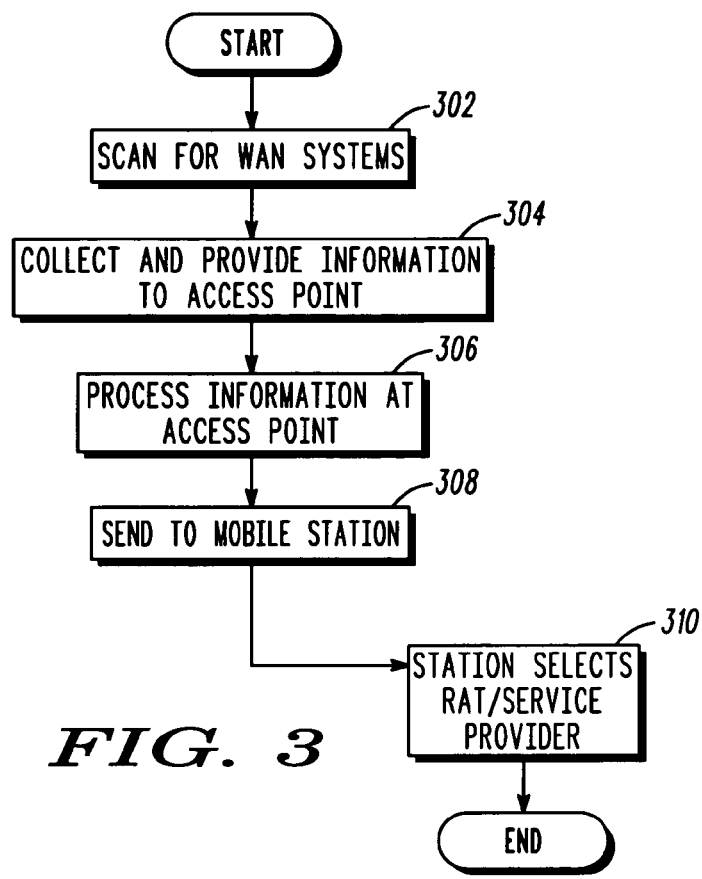
FIG. 3 is a flowchart showing the operation of the system for transitioning between networks according to principles of the present invention.

Referring now to FIG. 3, an example of a method for facilitating network-to-network transitions is described. At step 302, a receiver coupled to an access point scans for available WAN systems. In this regard, a different receiver may be used for a specific RAT. For instance, one receiver may be used to scan for available CDMA systems, another receiver for TDMA systems, another receiver for WCDMA systems, still another for AMPS systems, and another GSM systems.

The information concerning these systems is collected and provided to an access point at step 304. At step 306, the access point processes the received information. For example, the access point may determine the source RAT for the information, format the information and otherwise prepare the information for transmission to mobile stations.

At step 308, the access point transmits the information to the mobile station. The transmission may be triggered by the access point having received a message that the mobile station was in the vicinity of the access point. In this regard, the access point may transmit an indicator bit. When a mobile station detects the indicator bit, it may respond by requesting the proper transition information from the access point.

At step 310, the mobile station receives the information transmitted by the access point. From the information received, the mobile station determines the RAT/service provider combination to use. Other information may also be provided, for instance, allowing the mobile station to select the appropriate communication channel to use.

Figure 4:
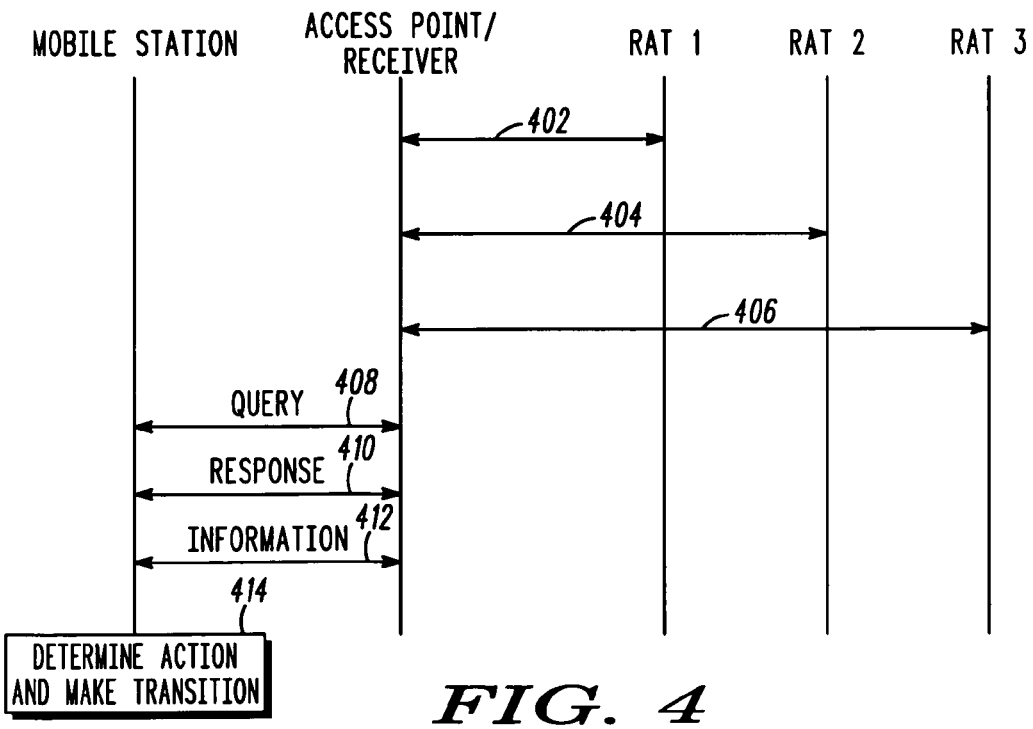
FIG. 4 is a call flow diagram showing the occurrence of a network-to-network transition according to principles of the present invention.

Referring now to FIG. 4, one example of a call-flow diagram showing the network-to-network transition is described. At steps 402, 404 and 406, an access point having multiple receivers receives information from three systems having different RATs. Steps 402, 404 and 406 may occur either serially or in parallel.

The access point, at step 408, sends an indicator bit that is received by a mobile station. In this case, the mobile station receives the indicator bit signal and responds by requesting information to allow the mobile station to make a network-to-network transition. The mobile station's response is placed in a response message and transmitted to the access point at step 410.

The access point processes the information received at steps 402, 404 and 406 and sends this to the mobile station at step 412. The processing includes receiving information from systems having different RATs and formatting the information in a message. At step 414, the mobile station determines the RAT/service provider it wishes to use and the transition occurs.

Figure 5:
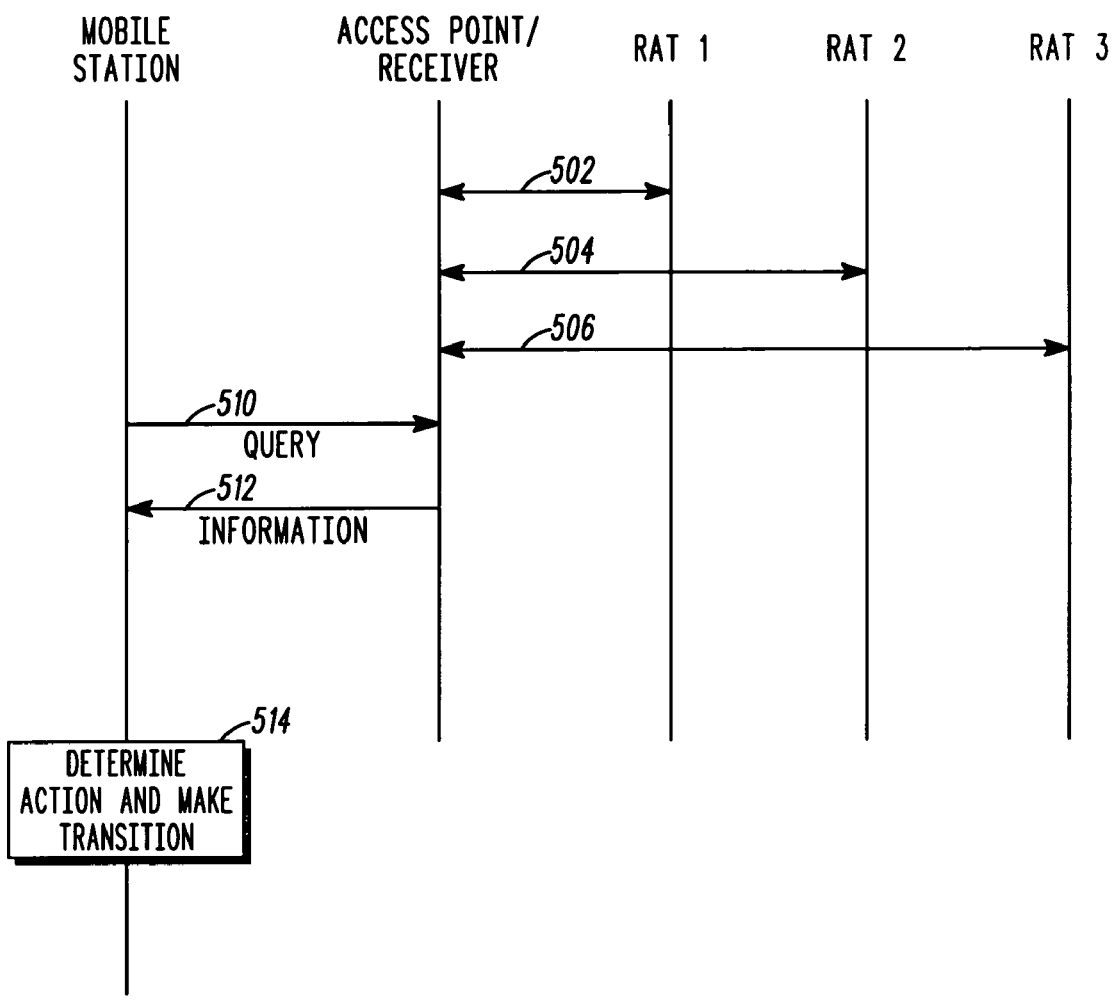
FIG. 5 is a call flow diagram showing the occurrence of a network-to-network transition without the use of a broadcast indicator bit according to principles of the present invention.

Referring now to FIG. 5, one example of a call-flow diagram showing the network-to-network transition without the use of a beacon is described. At steps 502, 504 and 506, an access point having multiple receivers receives information from three systems having different RATs. Steps 502, 504 and 506 may occur either serially or in parallel.

The query determines if information on the WAN is available. The mobile station issues a query at step 510. The query determines if information on the WAN is available. The access point processes the information received at steps 502, 504 and 506 and sends this to the mobile station at step 512. The processing includes receiving information from systems having different RATs and formatting the information in a message. At step 514, the mobile station determines the RAT/service provider it wishes to use and the transition occurs.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A system far facilitating network-to-network transitions of mobile stations comprising:
   a first receiver to provide access to a wireless local area network, wherein the first receiver is located at an access point of the wireless local area network; and
   at least one second receiver physically coupled to the first receiver, wherein the at least one second receiver is located at the access point and determines information concerning a wide area network and provides the information to the access point, and wherein the access point conveys the information to at least one mobile station, wherein the at least one mobile station is separate from the first receiver.

2. The system of claim 1 wherein the access point is located near a. transition region to the wide area network.

3. The system of claim 1 wherein the at least one mobile station comprises means for determining a preferred service provider from the information received from the at least one access point.

4. The system of claim 1 wherein the wide area network is chosen from a group comprising a code division multiple access (CDMA) network, a global system for mobile communications (GSM) network, a Universal Mobile Telecommunications System (UMTS) network, advanced mobile phone service (AMPS) network, and a time division multiple access (TDMA) network.

5. A method for facilitating network-to-network transitions of mobile stations comprising:
   scanning for and receiving information received from a wide area network receiver located at an access point of a wireless local area network, wherein the information concerning at least one characteristic of a wide area network to provide received information;
   supplying the received information to a wireless local area network receiver located at the access point and wherein the wireless local area network receiver being physically coupled to the wide are network receiver; and forwarding information that corresponds to the received information from the access point to at least one mobile station, wherein the at least one mobile station is separate from the wide area network receiver.

6. The method of claim 5 further comprising determining a strength measurement report at the access point and sending information that corresponds to the report to the at least one mobile station.

7. The method of claim 5 wherein scanning and receiving the information comprises scanning for the presence of a cellular network by decoding system information messages.

8. The method of claim 5 wherein scanning and receiving information comprises receiving information indicative of an available radio access technology (RAT) and available communication channels.

9. The method of claim 5 further comprising receiving the information at the at least one mobile station and transitioning to a wide area network determined at least in part based upon the information.

10. The method of claim 9 wherein transitioning from the service provider to a wide area network comprises transitioning to a network chosen from a group consisting of a code division multiple access (CDMA) network, a global system for mobile communications (GSM) network, a Universal Mobile Telecommunications System (UMTS) network, an advanced mobile phone service (AMPS) network, and a time division multiple access (TDMA) network.

11. A method of transitioning from a wireless local area network to a wide area network comprising:
receiving information from a wide area network receiver, wherein the information concerning at least one characteristic of the wide area network wherein the wide area network receiver located at an access point, to provide received information to a wireless local area network receiver located at the access point wherein the wide are network receiver being physically coupled to the wireless local are network receiver;
determining a service option from the received information; and
supplying the service option to at least one mobile station, wherein the at least one mobile station being separate from the wide area network receiver.

12. The method of claim 11 wherein receiving the information comprises receiving information indicative of an available radio access technology (RAT) available and an available communication channel.

13. The method of claim 11 wherein receiving the information includes receiving WAN system message content from the access point for the RAT of interest.

14. The method of claim 11 wherein receiving the information from an access point includes receiving the information from an access point at an edge of a transition region to a wide area network.

15. The method of claim 11 wherein receiving the information includes receiving a signal strength report from the access point.

16. The method of claim 11 further comprising transitioning from a wireless local area network to a wide area network based at least in part upon the received information.

17. The method of claim 16 wherein transitioning from the service provider to a wide area network comprises transitioning to a network chosen from a group consisting of a code division multiple access (CDMA) network, a global system for mobile communications (GSM) network, a Universal Mobile Telecommunications System (UMTS) network, an advanced mobile phone service (AMPS) network, and a time division multiple access (TDMA) network.

* * * * *